United States Patent [19]
Johnson et al.

[11] Patent Number: 6,148,517
[45] Date of Patent: Nov. 21, 2000

[54] REPAIR OF TURBINE EXHAUST CASE

[75] Inventors: Bruce Johnson, Niceville; Ben Blumanstock, Navarre, both of Fla.

[73] Assignee: Chromalloy Gas Turbine Corporation, San Antonio, Tex.

[21] Appl. No.: 09/239,263

[22] Filed: Jan. 29, 1999

[51] Int. Cl.[7] ..................................................... B23P 15/00
[52] U.S. Cl. .................. 29/889.1; 29/889.21; 29/402.08
[58] Field of Search ............................. 29/889.1, 402.08, 29/402.06, 889.21

[56] References Cited

PUBLICATIONS

Pratt & Whitney Aircraft JT3D–7 Overhaul Manual: Turbine Exhaust Case REPAIR–2, 72–54–1 (2 pages, dated prior to Jan. 29, 1998); Turbine Exhaust Case REPAIR–3, 72–54–1 (pp. 401–409, dated Mar. 1, 1978); and Turbine Exhaust Case REPAIR–10, 72–54–1 (pp. 401–407, dated Aug. 15, 1985).

Pratt & Whitney Service Bulletin No. 6077 (pp. 2–6, Aug. 1, 1992).

*Primary Examiner*—Irene Cuda
*Attorney, Agent, or Firm*—Mitchell D. Bittman

[57] ABSTRACT

A process is provided for repairing the horizontal mount area of a JT9D turbine exhaust case having two mounting flanges by inspecting the horizontal mount area, weld repairing any defects found in the case wall and installing a reinforcement brace onto the inside of the case wall in the horizontal mount area, wherein the reinforcement brace overlaps an area under one mounting flange and extends to and overlaps the area under the second mounting flange.

12 Claims, 3 Drawing Sheets

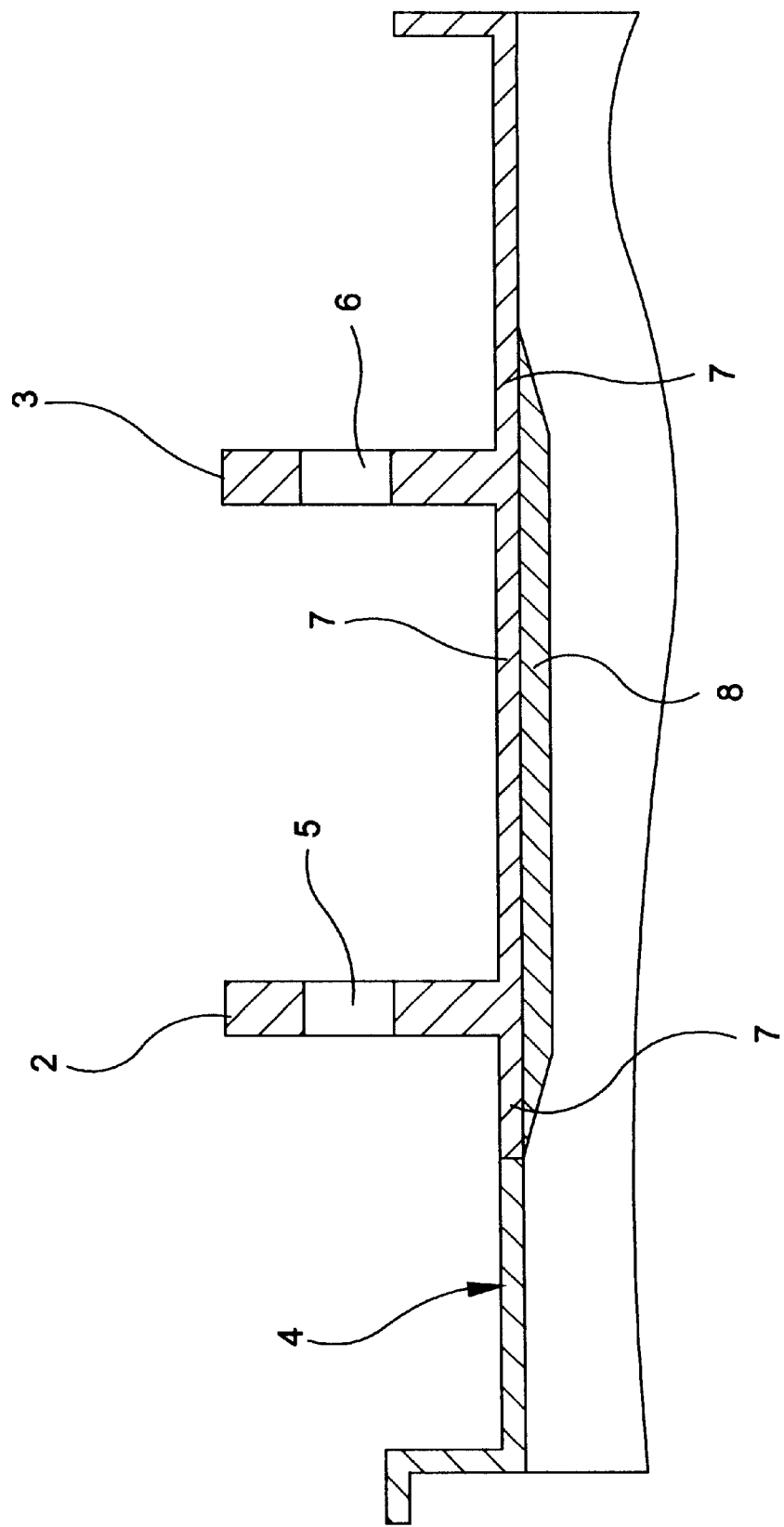

REPAIR OF TURBINE EXHAUST CASE

BACKGROUND

Many turbine exhaust cases of gas turbine engines exhibit circumferential cracks or weld repairs in the case wall adjacent to the mount lugs. The integrity of the engine rear mount is a concern with regard to these cracks and weld repairs. These concerns are focused on a phenomenon whereby thermal cycle loading combines with the constraint of the engine attachment hardware thus causing a condition which promotes circumferential cracking in JT9D turbine exhaust cases. Should cracks be present in the mount area of a structural member, the integrity of the engine mount area may be compromised in an event such as a fan blade out or a rotor seizure. Additionally there may be prior weld repairs of circumferential cracks in the mount areas which may reduce the ultimate strength of the case wall by introducing cast metal to the forged microstructure.

SUMMARY

A process is provided for repairing the horizontal mount area of a JT9D turbine exhaust case having two mounting flanges by inspecting the horizontal mount area, weld repairing any defects found in the case wall and installing a reinforcement brace onto the inside of the case wall in the horizontal mount area, wherein the reinforcement brace overlaps an area under one mounting flange and extends to and overlaps the area under the second mounting flange.

BRIEF DESCRIPTION OF THE DRAWINGS

FIG. 3 is a sectional view along line 3—3 of FIG. 2 with the mounting lug deleted.

DETAILED DESCRIPTION

The concept of the repair process of this invention is that the reinforcement brace reduces the localized stress concentration experienced by the case wall adjacent to the mount lugs in mounting flanges during normal thermal cycling of the engine which will prevent the occurrence of circumferential cracking. Further, the additional strength of the brace will reduce the localized stress of the mount area case wall during an abnormal occurrence such as a fan blade out or rotor seizure.

Figure 1:
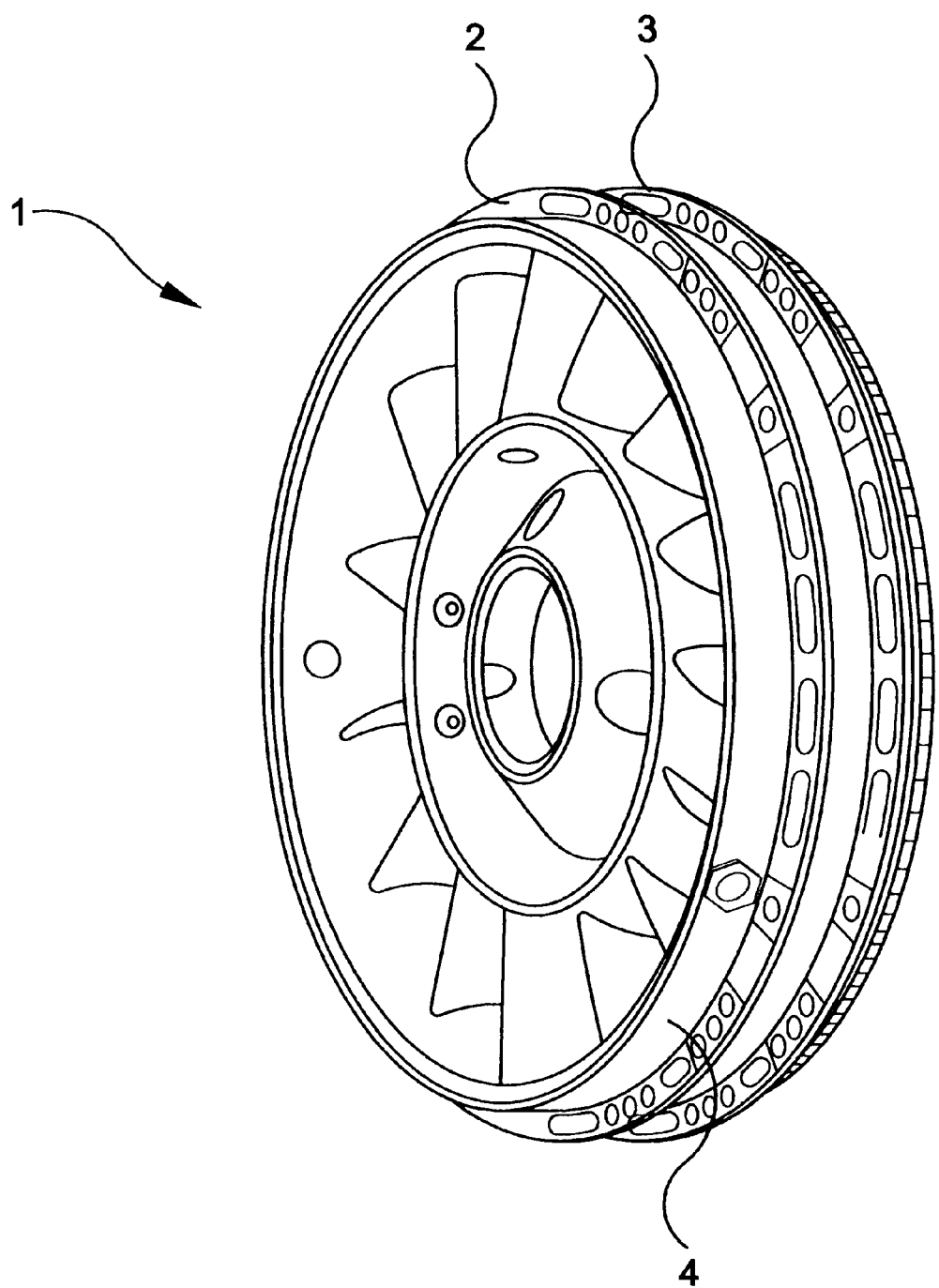
FIG. 1 is a perspective view of a turbine exhaust case.
Figure 2:
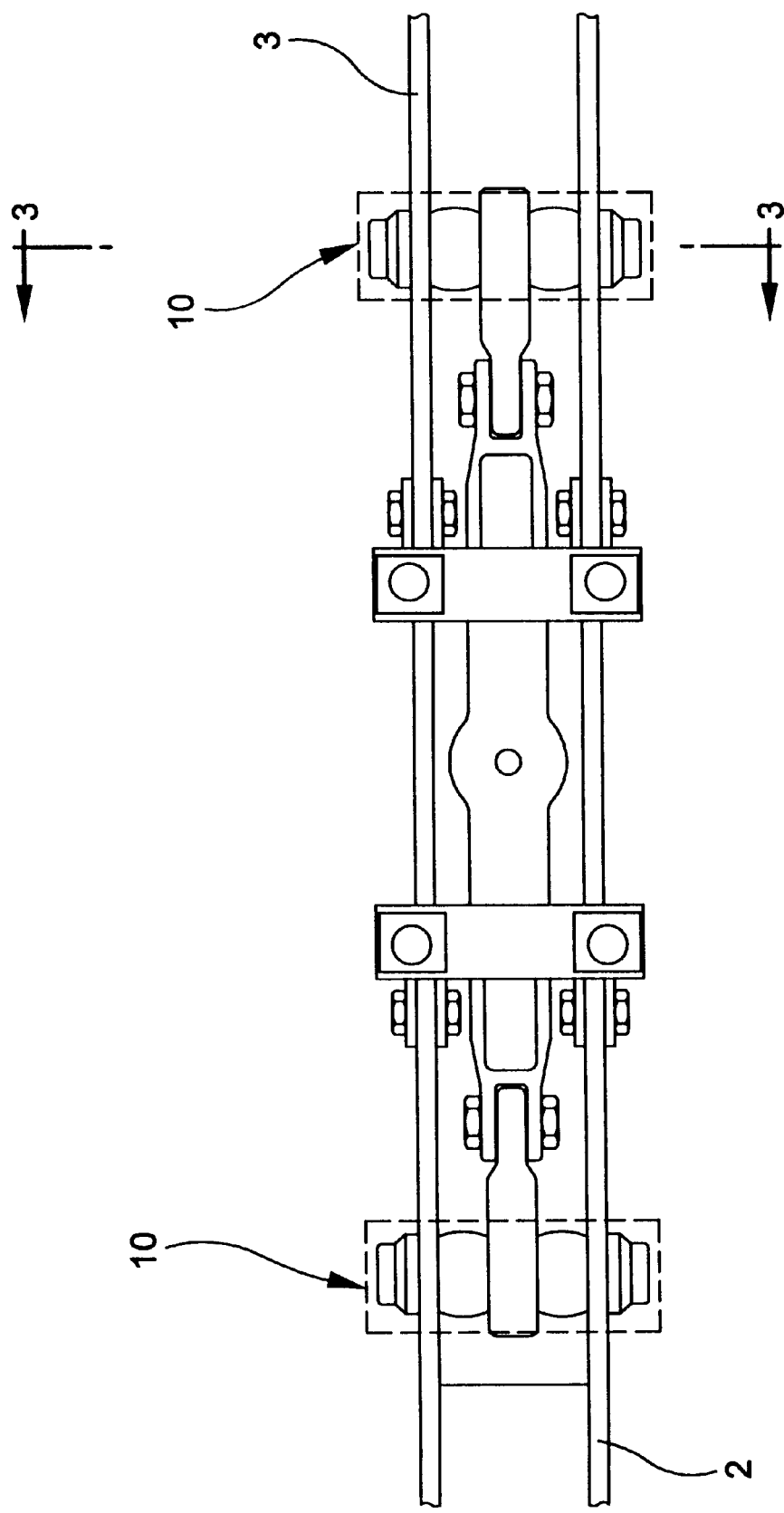
FIG. 2 is a partial top view of the exhaust case of FIG. 1.

FIG. 1 shows a turbine exhaust case 1 of a JT9D gas turbine engine having two mounting flanges 2 and 3 on the outside of the case wall 4 which are used for attaching the turbine exhaust case to a rear engine mount (not shown). FIG. 2 is a partial top view of FIG. 1 showing the mounting flanges 2 and 3 with the mount lugs 10 secured through the mounting flanges. FIG. 3 is a sectional view along line 3—3 from FIG. 2. FIG. 3 shows the R-Rail mounting flange 2 and S-Rail mounting flange 3 each having therein horizontal mount pinholes 5 and 6 respectively, for insertion of the mount lugs 10 shown in FIG. 2. The horizontal mount area 7 is the area of the case wall 4 adjacent to and between the horizontal mount pinholes 5 and 6 in the two mounting flanges 2 and 3.

The process of this invention involves first inspecting the horizontal mount area 7 of the turbine exhaust case 1. Any defects found in the inspection are weld repaired, typically by TIG welding, preferably using a filler metal of the same composition as the turbine exhaust case, which can be a martensetic steel, e.g. AMS 5616. Then a reinforcement brace 8 is installed onto the inside of the case wall 4 in the horizontal mount area 7. The brace 8 overlaps an area under one mounting flange 2 and extends to and overlaps an area under a second mounting flange 3.

Additional steps to be carried out include x-ray and fluorescent penetrant inspection of the weld repair and repair of any defects found in the weld. Following the repair a heat treatment is carried out in a vacuum furnace to reaustenitize and temper the turbine exhaust case, e.g. hold case at 1850° F. for 2 hours, cool to 600° F. for 30 minutes and temper at 1050° F. for 2 hours.

The reinforcement brace is a metal plate preferably of the same composition as the turbine exhaust case. The brace extends at least about 0.5 inches beyond the mounting flange and has a curvature which matches the inside of the exhaust case. Typically the brace has a length of about 6 to 7 inches, a width of about 2 to 5 inches and a thickness of 0.080 to 0.250 inches. The brace is installed by welding, e.g. TIG welding and typically two braces are installed on each JT9D exhaust case. The edges of the reinforcement brace can be tapered for aerodynamic stability.

What is claimed is:

1. Process for repairing a horizontal mount area of a JT9D turbine exhaust case, the turbine exhaust case having two mounting flanges on the outside of a case wall of the turbine exhaust case for attaching the turbine exhaust case to a rear engine mount through horizontal mounting pinholes in the mounting flanges, wherein the horizontal mount area is the area of the case wall of the turbine exhaust case adjacent to and between the horizontal mount pinholes in the two mounting flanges, near a rear engine mount attachment point, comprising:

inspecting the horizontal mount area of the turbine exhaust case;

weld repairing any defects found in the case wall of the horizontal mount area; and installing a reinforcement brace onto the inside of the case wall in the horizontal mount area, wherein the reinforcement brace overlaps an area under one mounting flange and extends to and overlaps the area under the second mounting flange, and wherein the reinforcement brace comprises a metal plate.

2. Process of claim 1 further comprising heat treating the repaired turbine exhaust case.

3. Process of claim 2 further comprising inspecting the weld repairs and repair of any defects found.

4. Process of claim 2 wherein the heat treatment is carried out in a vacuum furnace to reaustenitize and temper the turbine exhaust case.

5. Process of claim 4 wherein the reinforcement brace is installed by welding.

6. Process of claim 5 wherein the edges of the reinforcement brace are tapered.

7. Process of claim 1 wherein the installation of a reinforcement brace is repeated on at least two locations of the turbine exhaust case.

8. Process of claim 1 wherein the overlap of the reinforcement brace under each mounting flange extends at least about 0.50 inches beyond the mounting flange.

9. Process of claim 8 wherein the metal plate of the reinforcement brace has a curvature matching the inside of the exhaust case.

10. Process of claim 9 wherein the metal plate of the reinforcement brace is of the same composition as the turbine exhaust case.

11. Process of claim 10 wherein the reinforcement brace has a length of about 6 to 7 inches, a width of about 2 to 5 inches and a thickness of about 0.080 to 0.250 inches.

12. Process of claim 1 wherein the weld repair is carried out by TIG welding using filler metal of the same composition as the turbine exhaust case.

* * * * *